Nov. 29, 1938.   R. WEINGAND   2,138,392
ARTICLE OF MANUFACTURE
Filed March 27, 1936

INVENTOR
RICHARD WEINGAND
BY
Harold A. Swanson
ATTORNEY

Patented Nov. 29, 1938

2,138,392

UNITED STATES PATENT OFFICE 2,138,392

ARTICLE OF MANUFACTURE

Richard Weingand, Bomlitz, near Walsrode, Germany

Application March 27, 1936, Serial No. 71,079
In Germany April 4, 1935

10 Claims. (Cl. 152—165)

The present invention relates in general to pneumatic tubular bodies and in particular to pneumatic tires and inner tubes, composed of non-fibrous non-elastic plastic compositions. The word "tire" will be used throughout this specification and claims as a generic term covering a tire, an inner tube for a tire or the like.

An object of the invention is to provide a tire which is resilient and flexible but non-elastic. Another object of the invention is to provide a tire which may be repaired easily and conveniently.

A further object of the invention is to provide a tire which is very light in weight and may be stored in a small place.

A specific object of the invention is to provide a tire which may be dyed in a wide variety of colors and may have imparted thereto any desired decorative effects.

A further specific object of the invention is to provide a tire which is transparent, so that foreign bodies, such as nails or the like, may be easily located in the event of puncture or rupture.

Other objects and advantages of the invention will become apparent during the course of the following description.

According to the invention a flexible and resilient pneumatic tire having wide variety of novel characteristics and uses is formed from a non-fibrous cellulosic composition which may or may not be reinforced by extraneous fibrous material.

In the drawing, wherein like numerals are employed to designate like parts throughout the same:

Figure 1:
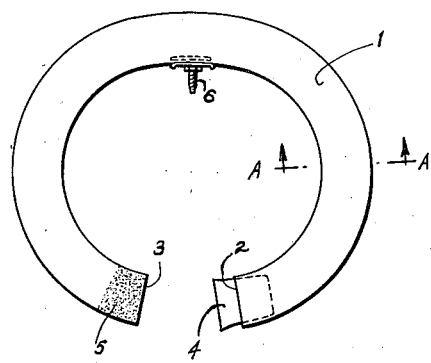
Fig. 1 is a view of a tubular body just prior to its assembly into a tire of the invention.
Figure 2:
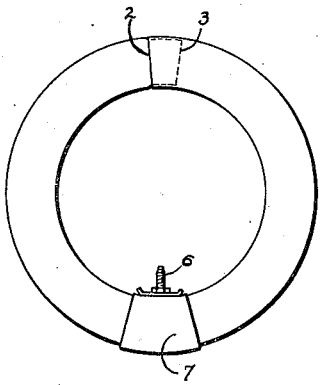
Fig. 2 illustrates one embodiment of a tire of the invention.

Referring to Fig. 1, a hollow tube 1 of a flexible and resilient non-fibrous cellulosic composition is curved in a known manner so that the ends of the tube 2 and 3 may be brought together without wrinkling or buckling the tube. One end such as 2 may be expanded by any suitable means such as a tapered plug 4, and the other end 3 given a coating of an adhesive or solvent 5. The end 3 is inserted into the interior of the end 2 and fastened therein to give a tire joint as shown in Fig. 2.

The tube 1 forms the inflatable element of the tire. The term "inflatable" is used herein to describe an element which is capable of being filled with a fluid without necessarily being stretched.

A suitable valve 6 may be joined to the tire directly as shown in Fig. 1, or a valve 6 may be affixed to or joined to a band 7 of a material which may be the same as or similar to that of tube 1. The band 7 is wrapped around and adhesively secured to the tube 1 thus fastening the valve 6 to the tube. An aperture, of course, is provided in the tube 1 to permit communication between the valve 6 and the interior of the tube 1.

Figure 3:
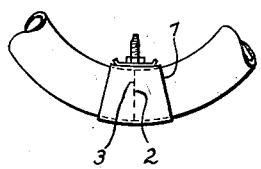
Fig. 3 shows one embodiment of the tire joint and valve assembly used in the article of the invention.

In Fig. 3 a modification of the joint and valve assembly is shown. Ends 2 and 3 of tube 1 are brought into abutting relation and a short section of tube 7, on which the valve is mounted, is slipped over the abutting ends 2 and 3. The ends 2 and 3 will be notched at the point which the valve contacts the joint to permit communication of the valve with the interior of the tube. Any suitable type of adhesive may be used in securing the parts together, for example, a cellulose derivative solution, a solution of a polymerization product or an aqueous adhesive which may be rendered insoluble by subsequent treatment, for example, gelatine, hardened by formaldehyde or potassium dichromate in the usual manner. A solvent or softening agent of the particular plastic used may be applied to activate the parts to be adhered and heat and pressure applied to form a joint.

Figure 4:
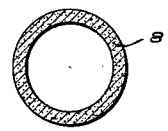
Figs. 4, 5 and 6 illustrate several embodiments of the invention and are slightly enlarged sections taken on the line A—A of Fig. 1.

In Fig. 4 there is shown a transverse section of the wall of another embodiment in which fibrous material 8 is distributed substantially homogeneously throughout the plastic from which the tire is made. Any suitable loose fibre may be employed such, for example, as asbestos, cotton, wool, cellulose, jute and other natural and synthetic fibrous material. The fibrous material is mixed with the plastic before formation of the tube and serves to reinforce the tire.

Figure 5:
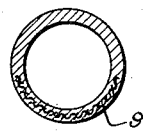

Fig. 5 shows a transverse section of a tire reinforced with a tape or band 9 formed of a fibrous material such as paper or a textile fabric. This tape or band will preferably be positioned adjacent the tread portion or the outer side in the case of an inner tube.

Figure 6:
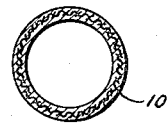

Fig. 6 is a view similar to that of Fig. 5 but shows a reinforcing fabric 10 which extends around the whole wall section and is embedded in the tire plastic. This fabric 10 may be in the form of a continuous woven tube or a flat strip wound to form a tube. It is obvious that reinforcing materials other than fabrics may be employed. A plurality of fabric layers may be employed in place of a single layer as shown in the drawing.

For the plastic of which the tire is made one may employ non-fibrous cellulosic plastics such as regenerated cellulose, cellulose esters, cellulose ethers or the like. Non-fibrous resinous plastics such as synthetic resins or polymerization products, such as polyacrylic acid esters, polyvinyl compounds or mixtures of these polymerization products may also be used. The above plastic compositions are characterized by being non-elastic but are adapted to form flexible and resilient articles.

Of the various plastic materials herein disclosed it has been found that the non-fibrous cellulosic plastics are superior to the non-fibrous resinous plastics for attaining the objects of the invention. The non-fibrous cellulosic plastics are characterized in general by having longer micells and the tubing formed therefrom has greater tensile strength than that formed of the resinous plastics. Moreover, the extrusion of the cellulosic tubing can be effected with greater economy and without the high pressures and temperatures required in the case of the resins. The non-fibrous cellulosic materials are capable of being dyed with a wide variety of organic dyestuffs and various fillers may be incorporated in such materials without substantially decreasing their tensile strength. The non-fibrous cellulosic materials have also a somewhat greater natural flexibility and resilience than the resinous plastics and for this reason the former are preferred in making tires which are not to contain any reinforcing fibrous material.

The tire may be manufactured from these materials according to any of the known methods, as by forming a tube by extrusion of the plastic or by wrapping a sheet of the plastic around a mandrel.

Plasticizers may be incorporated in the above compositions to render them more flexible and resilient. The amount of plasticizer may be varied according to the flexibility and resilience desired and is preferably added in amounts of about 15% to 40% by weight. Any suitable plasticizers may be used, for example, glycerine, glycol, tricresylphosphate, dibutylphthalate and the like, the particular plasticizer being selected according to the nature of the base material. It has been found that a wider variety of plasticizers may be used with the cellulosic plastics than with the resinous plastics. The plasticizer may be added to the composition before the formation of the tube or the tube may be formed and the plasticizer added as by impregnation of the tube in a solution of a plasticizer. For example, a tubing made of denitrated nitrocellulose may be plasticized by treatment with an aqueous solution containing 30% of glycerine and 15% of urea.

The tires made from the above compositions are sufficiently strong and are impermeable to cope with the usual pressures involved in use. Tires of the invention composed wholly of a non-fibrous cellulosic composition herein described are especially adapted for use on small vehicles, such as bicycles. However, that embodiment of the article wherein the plastic is reinforced with fibrous material is also suitable for use on larger vehicles. The tires of the invention may or may not have a tread thereon depending upon their use.

In the event of a puncture the tire of the invention may be very easily repaired as by filling the hole with a plastic similar to or of the same composition as that of which the tire is composed or a patch of a composition the same as or similar to that of the tube may be affixed to the tube by an adhesive or by a solvent for the particular composition. The cost of these tires is low and the process of making them very simple.

Any desired coloring or decorative effects may be obtained by dyeing or incorporating suitable fillers into the composition. The tires of the present invention can be made transparent even though dyed which enables one to very quickly locate a foreign body in the walls of the same. The tire may also be rendered opaque by incorporating suitable opaquing compounds into the composition from which the article is made or forming such opaque bodies in situ.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. As an article of manufacture a flexible and resilient pneumatic tire having an inflated element formed of a composition comprising non-fibrous cellulosic material.

2. As an article of manufacture a flexible and resilient pneumatic tire having an inflatable element formed of a composition comprising a non-fibrous cellulosic material selected from the class consisting of regenerated cellulose, cellulose esters and cellulose ethers.

3. As an article of manufacture a flexible and resilient pneumatic tire having an inflatable element composed of a non-fibrous cellulosic material and a plasticizer incorporated therein.

4. As an article of manufacture a flexible and resilient pneumatic tire having an inflatable element composed of a non-fibrous cellulosic material having a fibrous material substantially homogeneously distributed therethrough.

5. As an article of manufacture a flexible and resilient pneumatic tire having an inflatable element formed of a composition comprising a non-fibrous material selected from the class consisting of regenerated cellulose, cellulose esters and cellulose ethers and a fibrous material distributed substantially homogeneously therethrough.

6. As an article of manufacture a flexible and resilient pneumatic tire comprising an inflatable annular tubular body composed of a non-fibrous cellulosic composition, said body having a strip or band of a woven fabric composition in the wall adjacent the tread surface.

7. As an article of manufacture a flexible and resilient pneumatic tire comprising an inflatable annular tubular body composed of a non-fibrous cellulosic composition, said body having a woven tubular reinforcing fabric incorporated in the wall of the tube.

8. As an article of manufacture a flexible and resilient pneumatic bicycle tire having an inflatable element composed of a non-fibrous cellulosic material.

9. As an article of manufacture a flexible and resilient pneumatic bicycle tire having an inflatable element formed of a composition comprising a non-fibrous cellulosic material selected from the class consisting of regenerated cellulose, cellulose esters and cellulose ethers.

10. As an article of manufacture a flexible and resilient pneumatic bicycle tire having an inflatable element composed of plasticized regenerated cellulose.

RICHARD WEINGAND.